(12) United States Patent
Naito

(10) Patent No.: US 9,053,860 B2
(45) Date of Patent: Jun. 9, 2015

(54) TUNGSTEN POWDER, ANODE BODY FOR CAPACITORS, AND ELECTROLYTIC CAPACITOR

(75) Inventor: Kazumi Naito, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 13/996,851

(22) PCT Filed: Sep. 7, 2011

(86) PCT No.: PCT/JP2011/070349
§ 371 (c)(1),
(2), (4) Date: Jun. 21, 2013

(87) PCT Pub. No.: WO2012/086272
PCT Pub. Date: Jun. 28, 2012

(65) Prior Publication Data
US 2013/0277626 A1    Oct. 24, 2013

(30) Foreign Application Priority Data
Dec. 24, 2010 (JP) .................................. 2010-287234

(51) Int. Cl.
| | |
|---|---|
| H01B 1/02 | (2006.01) |
| H01G 9/042 | (2006.01) |
| B22F 1/00 | (2006.01) |
| B22F 1/02 | (2006.01) |
| B22F 3/10 | (2006.01) |
| C22C 1/04 | (2006.01) |
| C22C 27/04 | (2006.01) |
| H01G 9/052 | (2006.01) |

(52) U.S. Cl.
CPC .............. *H01G 9/042* (2013.01); *B22F 1/0096* (2013.01); *B22F 1/02* (2013.01); *B22F 3/10* (2013.01); *B22F 2201/20* (2013.01); *C22C 1/045* (2013.01); *C22C 27/04* (2013.01); *H01G 9/0525* (2013.01)

(58) Field of Classification Search
CPC ................ B22F 1/00; B22F 1/02; B22F 3/10; B22F 5/00; C22C 27/04; H01G 9/00; H01G 9/052; H01G 9/042
USPC ............. 252/515; 419/10; 427/215; 361/500; 148/279
See application file for complete search history.

(56) References Cited

U.S. PATENT DOCUMENTS

| | | | | |
|---|---|---|---|---|
| 3,236,634 | A | * | 2/1966 | Phillips et al. ................... 75/365 |
| 5,075,251 | A | * | 12/1991 | Torres et al. ................... 438/664 |
| 5,903,429 | A | * | 5/1999 | Kobayashi et al. ......... 361/275.4 |
| 5,919,321 | A | * | 7/1999 | Hirakawa ...................... 148/423 |
| 6,635,523 | B1 | * | 10/2003 | Uchiyama et al. ............. 438/239 |
| 6,843,824 | B2 | * | 1/2005 | Anderson ....................... 75/240 |
| 7,767,330 | B2 | * | 8/2010 | Merzougui et al. ........... 429/524 |
| 2004/0016978 | A1 | | 1/2004 | Yano et al. |
| 2005/0118449 | A1 | * | 6/2005 | Derderian et al. ............ 428/615 |
| 2008/0019857 | A1 | * | 1/2008 | Kondoh .......................... 419/28 |
| 2010/0052175 | A1 | * | 3/2010 | Seidel et al. ................... 257/762 |

FOREIGN PATENT DOCUMENTS

| | | |
|---|---|---|
| CN | 101323451 A * | 12/2008 |
| JP | 11-92807 A | 4/1999 |
| JP | 11-256322 A | 9/1999 |
| JP | 2003-272959 A | 9/2003 |
| JP | 2004-349658 A | 12/2004 |
| JP | 2006-22380 A | 1/2006 |
| WO | 2004/055843 A1 | 7/2004 |

OTHER PUBLICATIONS

International Search Report for PCT/JP2011/070349 dated Dec. 13, 2011.
Office Action dated Jul. 29, 2014, and received Sep. 2, 2014, issued by the State Intellectual Property Office of the People's Republic of China, in Chinese Application No. 201180062302.6.

* cited by examiner

Primary Examiner — Harold Pyon
Assistant Examiner — Danny N Kang
(74) Attorney, Agent, or Firm — Sughrue Mion, PLLC

(57) ABSTRACT

A tungsten powder having tungsten silicide such as $W_5Si_3$ on the surface of the particles and having a silicon content of 0.05 to 7 mass %; an anode body for capacitors; an electrolytic capacitor; a method for producing the tungsten powder; and a method for producing the anode body for capacitors. The tungsten powder has an average primary particle diameter of 0.1 to 1 μm, wherein tungsten silicide is localized within 50 nm from the particle surface. Further, the tungsten powder contains at least one member selected from tungsten nitride, tungsten carbide and tungsten boride on a part of the particle surface.

19 Claims, No Drawings

TUNGSTEN POWDER, ANODE BODY FOR CAPACITORS, AND ELECTROLYTIC CAPACITOR

CROSS REFERENCE TO RELATED APPLICATIONS

This application is a National Stage of International Application No. PCT/JP2011/070349 filed Sep. 7, 2011, claiming priority based on Japanese Patent Application No. 2010-287234 filed Dec. 24, 2010, the contents of all of which are incorporated herein by reference in their entirety.

TECHNICAL FIELD

The present invention relates to a tungsten powder, an anode body for capacitors using the tungsten powder, and the electrolytic capacitors using the anode body.

BACKGROUND ART

With the progress of small-size, high-speed and light-weight electronic devices such as cellular phones and personal computers, the capacitor used for these electronic devices is demanded to have a smaller size, a larger capacitance and a lower ESR.

As an example of such a capacitor, the electrolytic capacitor has been proposed, which capacitor is produced by anodically oxidizing an anode body for capacitors comprising a sintered body made of a valve-acting metal powder such as tantalum which can be anodized to form a dielectric layer made of the oxide of the metal on the surface of the anode body.

The electrolytic capacitor using tungsten as a valve-acting metal and employing the sintered body of the tungsten powder as an anode body can attain a larger capacitance compared to the electrolytic capacitor obtained at the same formation voltage by employing the anode body of the same volume using the tantalum powder having the same particle diameter. However, the electrolytic capacitor having the sintered body of the tungsten powder has been unpracticed as an electrolytic capacitor due to the large leakage current (LC). In order to solve this issue, a capacitor using the alloy of tungsten and other metals has been studied and has achieved some improvement in the leakage current, but it was not enough (JP-A-2004-349658 (U.S. Pat. No. 6,876,083 B2); Patent Document 1).

Patent Document 2 (JP-A-2003-272959) discloses a capacitor using an electrode of a tungsten foil selected from $WO_3$, $W_2N$ and $WN_2$ having formed thereon a dielectric layer, but the capacitor is not to solve the above-mentioned leakage current problem.

Also, Patent Document 3 (WO 2004/055843 publication (U.S. Pat. No. 7,154,743 B2)) discloses an electrolytic capacitor using an anode body selected from tantalum, niobium, titanium and tungsten, but it does not describe a specific example using tungsten in the specification.

PRIOR ART

Patent Document

Patent Document 1: JP-A-2004-349658
Patent Document 2: JP-A-2003-272959
Patent Document 3: WO 2004/055843

DISCLOSURE OF THE INVENTION

Problems to be Solved by the Invention

An object of the present invention is to provide a tungsten powder which can solve the leakage current (LC) problem in the electrolytic capacitor using as an anode body comprising a sintered body of the tungsten powder as a valve-acting metal, an anode body using the tungsten powder, and an electrolytic capacitor using the anode body as an electrode.

Means to Solve the Problem

The present inventors have found that the above-mentioned problem can be solved by using a sintered body of the tungsten powder, a part of the surface of which is made to be tungsten silicide so as to make the silicon content within a specific range, and accomplished the present invention.

That is, the present invention relates to the tungsten powder, the anode body made of tungsten, the electrolytic capacitor, the method for producing the tungsten powder and the method for producing the anode body for capacitors as described below.

[1] A tungsten powder having tungsten silicide on the surface of the particles and having the silicon content of 0.05 to 7 mass %.
[2] The tungsten powder as described in [1] above, wherein the tungsten silicide is $W_5Si_3$.
[3] The tungsten powder as described in [1] above, wherein the average primary particle diameter is 0.1 to 1 µm.
[4] The tungsten powder as described in [1] above, wherein tungsten silicide is localized within 50 nm from the particle surface.
[5] The tungsten powder as described in [1] above, having at least one member selected from tungsten nitride, tungsten carbide and tungsten boride on a part of the particle surface.
[6] The tungsten powder as described in [1] above, wherein the elemental phosphorous content is 1 to 500 mass ppm.
[7] The tungsten powder as described in [1] above, wherein the oxygen content is 0.05 to 8 mass %.
[8] The tungsten powder as described in [1] above, wherein the content of the elements other than tungsten, silicon, nitrogen, carbon, boron, phosphorous and oxygen is 0.1 mass % or less.
[9] The tungsten powder as described in any one of [1] to [8] above, wherein the tungsten powder is a granulated powder.
[10] The tungsten powder as described in [9] above, wherein the average particle diameter is 50 to 200 µm.
[11] The tungsten powder as described in [9] or [10] above, wherein the specific surface area is 0.2 to 20 $m^2/g$.
[12] The tungsten powder as described in any one of [1] to [11], wherein the tungsten powder is for use in the electrolytic capacitor.
[13] An anode body for capacitors obtained by sintering the tungsten powder described in any one of [1] to [12] above.
[14] An electrolytic capacitor composed of the anode body for capacitors described in [13] above as one electrode and a dielectric body interposed between the electrode and a counter electrode.
[15] A method for producing the tungsten powder described in any one of [1] to [12] above, comprising mixing 0.05 to 7 mass % of the silicon powder into the tungsten powder and allowing the mixture to react by heating under reduced pressure.
[16] The method for producing the tungsten powder as described in [15] above, wherein the heating temperature is 1,100 to 2,600° C.

[17] A method for producing the tungsten powder described in any one of [1] to [8] above, comprising pulverizing tungsten trioxide using the pulverizing media of the metal silicide under hydrogen atmosphere, followed by mixing the silicon powder into the pulverized powder and allowing the mixture to react by heating under reduced pressure.

[18] The method for producing the tungsten powder as described in [17] above, wherein the heating temperature is 1,100 to 2,600° C.

[19] The method for producing an anode body for capacitors, comprising sintering the tungsten powder described in any one of [9] to [11].

Effects of the Invention

The tungsten powder of the present invention enables the production of electrolytic capacitors having an equal or higher capacitance and good LC per capacitance characteristics compared to the case of using a conventional tungsten powder or a tungsten alloy powder.

MODE FOR CARRYING OUT THE INVENTION

The tungsten powder (unprocessed tungsten powder) used in the present invention is commercially available. The tungsten powder having a still smaller particle diameter can be obtained by, for example, pulverizing the tungsten trioxide powder under hydrogen atmosphere; or reducing the tungstic acid and tungsten halide using a reducing agent such as hydrogen and sodium, or appropriately selecting the reducing conditions.

Also, the tungsten powder can be obtained by reducing the tungsten-containing mineral directly or through several steps and by selecting the reducing conditions.

The tungsten powder of the present invention, in which at least a part of the particle surface is silicified, can be obtained by, for example, mixing the silicon powder well into the tungsten powder and allowing the mixture to react by heating under reduced pressure. In the case of using this method, the silicon powder reacts with the tungsten from the surface of the tungsten particles and tungsten silicide such as $W_5Si_3$ is formed and localized generally within 50 nm from the surface layer of the tungsten particles. Hence, the core of the primary particles remains as a highly-conducting metal, which suppresses the equal serial resistance of the anode body produced using the tungsten powder, which is preferable. The tungsten silicide content can be adjusted by the silicon amount to be added. As for any kinds of tungsten silicides, the silicon content can be used as an index for the tungsten silicide content. The silicon content of the tungsten powder of the present invention is preferably 0.05 to 7 mass %, and particularly preferably 0.2 to 4 mass %. The tungsten powder containing silicon within the above-mentioned range is a preferable powder for use in the electrolytic capacitors, imparting good LC characteristics to the capacitors. When the silicon content is less than 0.05 mass %, the powder is not capable of imparting good LC characteristics to the capacitors in some cases. When the silicon content exceeds 7 mass %, the tungsten powder contains too much tungsten silicide and fails to form a dielectric layer well in some cases when a sintered body obtained by sintering the powder is processed as an anode body by chemical formation.

When the above-mentioned low-pressure condition is set to $10^{-1}$ Pa or lower, preferably $10^{-3}$ Pa or lower, the oxygen content of the tungsten powder can be configured to a preferable range of 0.05 to 8 mass %.

The reaction temperature is preferably 1,100° C. or higher and 2,600° C. or lower. The smaller the particle diameter of the silicon to be used, the silicification can be carried out at a lower temperature. However, when the reaction temperature is lower than 1,100° C., it takes time for silisification. When the reaction temperature exceeds 2,600° C., the silicon comes to evaporate easily, which will require the maintenance for the high-temperature vacuum furnace.

The time period for allowing the powder at a high temperature is preferably three minutes or more and less than two hours. The optimum conditions suitable for the temperature and period of time according to the high-temperature vacuum furnace to be used can be determined by analyzing the powder produced in the preliminary experiment.

The tungsten powder may further be granulated (Hereinafter, the granulated tungsten powder may be simply referred to as the "granulated powder"). As the powder for use in the electrolytic capacitors, the granulated powder is preferable since it facilitates the formation of fine pores in the anode body.

Using each of the above-mentioned ungranulated tungsten powders (hereinafter may be referred to as the "primary powder"), the fine pore distribution may be adjusted in the manner as JP-A-2003-213302 discloses a case for the niobium powder.

The silicon to be used may be a massive form or in form of granules. Taking the miscibility with the tungsten powder into consideration, the silicon powder having a small particle diameter can be uniformly mixed, which is preferable. The silicon mixed with the tungsten powder reacts with the surface layer of the tungsten powder particles. Generally, the silicide amount of the tungsten powder, in which at least a part of the surface of the powder particles is silicified, is almost equal to the feeding amount of the silicon at the time of silicification reaction. Hence, the feeding amount of silicon at the time of silicification reaction may be approximately 0.05 to 7 mass %, preferably 0.2 to 4 mass %, which is the same amount of the silicon content of the tungsten silicide-containing tungsten powder as the target.

The powder having an even smaller particle diameter can be obtained by pulverizing the tungsten trioxide powder using the pulverizing media under hydrogen atmosphere. As the pulverizing media, using the pulverizing media made of the metal silicide such as zirconium silicide and tungsten silicide is preferable. In the case of using these metal silicides, even if fine fragments of the pulverizing media may be mixed into the powder, it has a small influence on the capacitor characteristics. Particularly, the pulverizing media made of tungsten silicide, which is less likely to be an impurity, is preferable.

In the tungsten powder, in which at least a part of the surface is silicified, an unreacted tungsten powder may be mixed. In this case, the silicon content is preferably within the above-mentioned range in the condition that the two powders are mixed.

The granules of each of the tungsten powders can be obtained by sintering each of the powders at a high temperature under reduced pressure to be made in form of granules or a massive form, cooling the sintered powder to room temperature and pulverizing it with a hammer mill and the like. In this case, the conditions of the pressure and temperature, standing time and the like may be the same as those for obtaining a tungsten powder in which at least a part of the particle surface is silicified at a high temperature under reduced pressure as mentioned above. Furthermore, it is preferable to set the temperature higher by about 100 to 300° C. because a granulated powder having strength can be obtained.

The granulated powder can also be obtained by adding at least one member of the liquid such as water and liquid resin to the primary powder so as to be made into the granules having an appropriate size; and sintering the granules by heating under reduced pressure. The reduced-pressure condition and the period of time the granules kept at a high temperature can be determined within the above-mentioned range by a preliminary experiment. If there are no agglomerations of the granules with each other after the sintering, there is no need for pulverization.

Such granulated powder can be classified by a sieve into each particle having a similar diameter. When the powder is molded as an anode body for an electrolytic capacitor, the average particle size within a range of preferably 50 to 200 μm, more preferably 100 to 200 μm, is preferable because the powder can smoothly flow from the hopper of the molding machine to a mold.

The tungsten powder having an average primary particle diameter of 0.1 to 1 μm, preferably 0.1 to 0.3 μm, in which at least a part of the particle surface is silicified can increase the capacitance of the electrolytic capacitor, particularly when the capacitor is produced from the granulated powder thereof.

When obtaining such a granulated powder, it is favorable to make the granulated powder so as to have a specific surface area (by BET method) of preferably 0.2 to 20 m$^2$/g, more preferably 1.5 to 20 m$^2$/g, by controlling the above-mentioned primary particle diameter because it can further increase the capacitance of the electrolytic capacitor.

As the tungsten powder in which at least a part of the particle surface is silicified of the present invention, the powder further containing at least one member selected from tungsten nitride, tungsten carbide and tungsten bromide can be suitably used.

As an example of the method for nitriding a part of the surface of each tungsten powder, there is a method of placing the tungsten powder at 350 to 1,500° C. under reduced pressure and allowing the nitrogen gas to pass through the powder for from several minutes to several hours. The nitridation may be performed at the time of high temperature treatment to silicify the tungsten powder, or the nitridation may be performed prior to the silicification. Furthermore, the nitridation may be performed in the stage of the primary powder, after producing the granulated powder, or after producing the sintered body. Thus, the timing of the nitridation is not specified but it is preferable to make the tungsten powder to have a nitrogen content of 0.01 to 1 mass % in an early stage of the production process. The nitridation can prevent excessive oxidation of the powder when the powder is handled in air.

In the above-mentioned nitrogen content, not only the nitrogen bonded to tungsten but also the nitrogen having no chemical bond with tungsten (e.g. nitrogen solute in a solid solution) is included.

As an example of the method for carbonizing a part of the surface of each tungsten powder, there is a method of placing the tungsten powder at 300 to 1,500° C. under reduced pressure in a high temperature vacuum furnace using carbon electrodes for from several minutes to several hours. It is preferable to perform the carbonization so as to make the carbon content to 0.001 to 0.5 mass % by selecting the temperature and period of time. The timing of the carbonization is the same as mentioned in the timing of the nitridation. When the nitrogen is allowed to pass in the furnace using carbon electrodes under predetermined conditions, the carbonization and the nitridation occur simultaneously, which enables the production of the tungsten powder in which a part of the surface is silicified, nitrided and carbonized.

As an example of the method for boronizing a part of the surface of the tungsten powder in which a part of the surface is silicified, there is a method of placing the boron element or a boron-containing compound as a boron source when granulating the tungsten powder. It is preferable to boronize the powder so as to have the boron content of 0.001 to 0.1 mass %. Good LC characteristics can be attained when the boron content is within the above-mentioned range. The timing of the boronization is the same as mentioned in the timing of the nitridation. When powder is granulated by placing the nitrided tungsten powder with a boron source in a furnace using carbon electrodes, it is possible to produce a tungsten powder in which a part of the surface is silicified, nitrided, carbonized and boronized. When the boronization is performed to obtain a predetermined boron content, the LC characteristics are further improved in some cases.

At least one member of the nitrided tungsten powder, carbonated tungsten powder and boronized tungsten powder may be added to the tungsten powder in which at least a part of the surface is silicified. In this case, it is also preferable to blend each element of silicon, nitrogen, carbon and boron in an amount so that the each content satisfies the above-mentioned range.

The above-mentioned nitridation, carbonization and boronization methods are explained for the case using the tungsten powder in which a part of the surface is silicified in advance. It is also possible to subject the tungsten powder to at least one of nitridation, carbonization and boronization in advance and silicify a part of the tungsten powder. A powder of simple tungsten may be mixed with the tungsten powder obtained by subjecting a tungsten powder in which at least a part of the surface is silicified to at least one of nitridation, carbonization and boronization. In this case each element of silicon, nitrogen and carbon is preferably blended in an amount so that the each content satisfies the above-mentioned range.

The oxygen content of the tungsten powder of the present invention is preferably 0.05 to 8 mass %, and more preferably 0.08 to 1 mass %.

As a method for controlling the oxygen content to 0.05 to 8 mass %, there is a method of oxidizing the surface of the tungsten powder in which at least a part of the surface is silicified and further subjected to at least one of nitridation, carbonization and boronization. Specifically, nitrogen gas containing oxygen is introduced at the time of taking out the powder from a high temperature vacuum furnace at the time of producing a primary powder or a granulated powder of each powder. In case that the temperature at the time of taking out from the high temperature vacuum furnace is lower than 280° C., oxidation takes priority over nitridation. By feeding the gas gradually, a predetermined oxygen content can be obtained. By making each of the tungsten powders have a predetermined oxygen content in advance, it is possible to reduce the deterioration due to the irregular excessive oxidation during the subsequent processes for producing anode bodies for electrolytic capacitors using the powder. In case that the oxygen content is within the above-mentioned range, the LC characteristics of the produced electrolytic capacitors can be kept better. In the case when the nitridation is not performed in this process, an inert gas such as argon and helium may be used instead of the nitrogen gas.

The phosphorous content of the tungsten powder of the present invention is preferably from 1 to 500 mass ppm.

As an example of the methods for incorporating the phosphorous element in an amount of 1 to 500 mass ppm in the tungsten powder in which at least a part of the surface is silicified and further subjected to at least one of nitridation, carbonization and boronization, there is a method of producing the phosphorous-containing powder by placing phosphorous or a phosphorous compound in the high temperature vacuum furnace as a phosphorous source at the time of producing a primary powder or a granulated powder of each tungsten powder. It is preferable to incorporate phosphorous in the tungsten powder so as to make the phosphorous content within the above-mentioned range by controlling the amount of the phosphorous source and the like because the physical breakdown strength of the anode bodies produced thereof can be improved in some cases.

In the tungsten powder in which at least a part of the surface is silicified, it is preferable to keep the total content of impurity elements other than each element of silicon, nitrogen, carbon, boron, oxygen and phosphorous to 0.1 mass % or lower to attain better LC characteristics. In order to keep the content of these elements to the above-mentioned value or lower, the amount of the impurity elements contained in the raw materials, pulverizing member to be used, containers and the like should be closely examined.

Anode bodies for capacitors can be obtained by sintering the tungsten powder of the present invention. Furthermore, an electrolytic capacitor is fabricated using the above-mentioned anode body as one electrode (anode) and a dielectric body interposed between the electrode and a counter electrode (cathode).

EXAMPLES

The present invention is described below by referring to Examples and Comparative Examples, but the present invention is not limited thereto.

In the present invention, the measurement of the particle diameter and the specific surface area and elemental analysis were carried out by the methods described below.

The particle diameter was measured by using HRA9320-X100 manufactured by Microtrack and the particle size distribution was measured by the laser diffraction scattering method. A particle size value ($D_{50}$; μm) when the accumulated volume % corresponded to 50 volume % was designated as the average particle size. The diameter of the secondary particles is to be measured by this method. However, since a primary powder generally has good dispersibility, the average particle diameter of the primary powder measured by the above measuring equipment can be regarded almost as an average primary particle diameter.

The specific surface area was measured by the BET method by using NOVA2000E (manufactured by SYSMEX).

For the elemental analysis, ICP emission spectrometry was performed by using ICPS-8000E manufactured by Shimadzu Corporation.

Example 1

A primary powder of tungsten having an average particle diameter of 0.5 μm and a specific surface area of 0.3 $m^2/g$ was obtained by reducing tungstic acid in the stream of hydrogen at 980° C. Into the powder, 4.8 mass % of a commercially-available silicon powder (average diameter of 1 μm) prepared separately was mixed. The mixture was placed in a container made of tungsten, kept in a high temperature vacuum furnace using molybdenum electrodes at $3 \times 10^{-4}$ Pa and 1,320° C. for 20 minutes, cooled to room temperature and returned under ordinary pressure. Subsequently, the powder was pulverized by using a hammer mill, and coarse particles were removed by using a sieve having a mesh size of 320 μm to thereby obtain a tungsten granulated powder. The obtained granulated powder had an average particle diameter of 120 μm and a specific surface area of 0.2 $m^2/g$.

The elemental analysis of the obtained granulated powder revealed that the powder contained 4.8 mass % of silicon, 0.95 mass % of oxygen. The content of each of the impurity elements was 350 mass ppm or less.

As a result of the analysis of the granulated powder by an x-ray diffractometer (X'pert PRO; manufactured by PANalytical), tungsten silicide was detected as a reaction product on the surface of the granulated powder particles. Most of the detected tungsten silicide was $W_5Si_3$. The granulated powder was also analyzed by the sputtering method and it was found that tungsten silicide as a reaction product exists in a range within 30 nm from the surface of the particle surface of the granulated powder. That is, it was confirmed that silicon exists as tungsten silicide in at least a part of the surface layer of the granulated powder.

Examples 2 to 5 and Comparative Examples 1 to 2

A tungsten granulated powder was obtained in the same manner as in Example 1 except that the blending quantity of silicon was changed. The average particle diameter and the specific surface area of the powder in each example were similar to those in Example 1. The contents of silicon and oxygen of the granulated powder obtained in each example resulted in those as in Table 1, and the content of each of the other impurity element was 350 mass ppm or less.

Example 6

A commercially-available tungsten trioxide powder, pulverizing media (tungsten silicide balls of 1 mm diameter) of 25 times by mass of the tungsten trioxide powder and water were placed in a pulverizer "ATTRITOR" manufactured by Mitsui Mining Co., Ltd. such that the solid portion is immersed in water; and pulverized in the stream of hydrogen at 70° C. for five hours.

After removing the pulverizing media, water was evaporated to obtain a primary tungsten powder having an average particle diameter of 0.3 μm and a specific surface area of 2.3 $m^2/g$. Next, a commercially-available silicon powder (average particle diameter of 1 μm) was added to the tungsten powder in an amount of 3.7 mass % and well mixed, and the mixture was placed into a high-temperature vacuum furnace and left to stand at $7 \times 10^{-4}$ Pa and 1,360° C. for 20 minutes. When the temperature goes down to 1,000° C. during decrease in temperature, a nitrogen gas was introduced in the furnace so that the pressure comes to 10 KPa and maintained for 10 minutes. Finally, a mixed gas of 5 vol % oxygen and 95 vol % of nitrogen was allowed to pass through the furnace at an ordinary temperature and pressure for one hour, and the powder was taken out from the furnace. Next, the powder was pulverized with a hammer mill and coarse particles were removed by using a sieve having a mesh size of 320 μm to thereby obtain a tungsten granulated powder. The obtained granulated powder had an average particle diameter of 100 μm and a specific surface area of 1.6 $m^2/g$; and contained 3.7 mass % of silicon, 880 mass ppm of oxygen and 0.15 mass % of nitrogen. The content of each of the other impurity elements was 260 mass ppm or less.

Example 7

By subjecting tungsten chloride to vapor-phase reduction at 400° C., a tungsten primary powder having an average particle diameter of 0.1 μm and a specific surface area of 9.6 m²/g was obtained. 20 g of the tungsten powder was well mixed in a separately prepared solution of 0.3 g of stearic acid dissolved in 3 g of toluene to obtain a granular mixture having an average particle diameter of 160 μm. Phosphoric acid was added to the obtained granular mixture in an amount of 0.05 mass %, and 0.1 g of silicon powder having an average particle diameter of 1 μm was further added and mixed well. The mixture was placed in the high-temperature vacuum furnace used in Example 1 and left to stand at a pressure at $1\times10^{-3}$ Pa and 1,340° C. or lower for 20 minutes. After cooled to room temperature, the furnace was returned to an ordinary pressure. The thus obtained tungsten granulated powder had an average particle diameter of 180 μm and a specific surface area of 8.8 m²/g; and contained 0.5 mass % of silicon, 0.33 mass % of oxygen, 300 mass ppm of carbon and 100 mass ppm of phosphorous. The content of each of the other impurity elements was 150 mass ppm or less.

Example 8

Before producing a granulated powder in the way of Example 4, a boron solution (a solution containing boron in an amount of 0.1 mass % dissolved in an aqueous solution of 20 mass % nitric acid) was added to the tungsten primary powder in advance so that the boron is to be contained in an amount of 0.03 mass % and mixed. The mixture was left to stand at a reduced pressure of $7\times10^2$ Pa and 260° C. for two hours to be dried and returned to room temperature. The thus-treated tungsten powder was mixed with silicon in the same way as in Example 4 to obtain a tungsten granulated powder, except that the temperature of the high-temperature vacuum furnace with molybdenum electrodes was set to 1,420° C. The obtained granulated powder had an average particle diameter of 120 μm and a specific surface area of 0.2 m²/g; and contained 0.5 mass % of silicon, 1.05 mass % of oxygen, 400 mass ppm of nitrogen and 280 mass ppm of boron. The content of each of the other impurity elements was 350 mass ppm or less.

Example 9

A tungsten granulated powder was obtained in the same way as Example 6 except for the process of passing a mixed gas through the furnace before the powder was taken out of the furnace. The obtained granulated powder had an average particle diameter of 100 μm and a specific surface area of 1.6 m²/g; and contained 3.7 mass % of silicon, 5.4 mass % of oxygen and 0.13 mass % of nitrogen. The content of each of the other impurity elements was 350 mass ppm or less.

Example 10

A tungsten granulated powder having an average particle diameter of 180 μm and a specific surface area of 8.8 m²/g was obtained in the same way as in Example 7 except that 50 ml of water having 0.1 g of silicon powder of an average particle diameter 1 μm dispersed therein was used instead of a toluene solution of stearic acid at the time of producing a granular mixture in the way of Example 7. The obtained granulate powder contained 0.5 mass % of silicon and 3.1 mass % of oxygen. The content of each of the other impurity elements was 550 mass ppm or less.

Example 11

A granulated powder was obtained in the same way as in Example 8 except that a boron solution was added to the tungsten primary powder in advance so that the boron is to be contained in an amount of 0.055 mass %. The obtained granulated powder had an average particle diameter of 120 μm and a specific surface area of 0.2 m²/g; and contained 0.5 mass % of silicon, 1.05 mass % of oxygen, 400 mass ppm of nitrogen and 490 mass ppm of boron. The content of each of the other impurity elements was 350 mass ppm or less.

Example 12

A granulated powder was obtained in the same way as in Example 8 except that a boron solution was added to the tungsten primary powder so that the boron is to be contained in an amount of 0.005 mass %. The obtained granulated powder had an average particle diameter of 120 μm and a specific surface area of 0.2 m²/g; and contained 0.5 mass % of silicon, 1.1 mass % of oxygen, 400 mass ppm of nitrogen and 2 mass ppm of boron. The content of each of the other impurity elements was 350 mass ppm or less.

Example 13

A granulated powder was obtained in the same way as in Example 7 except that a phosphoric acid was added to the tungsten primary powder in an amount of 0.3 mass %. The obtained granulated powder had an average particle diameter of 180 μm and a specific surface area of 8.8 m²/g; and contained 0.5 mass % of silicon, 3.5 mass % of oxygen, 300 mass ppm of carbon and 480 mass ppm of phosphorous. The content of each of the other impurity elements was 150 mass ppm or less.

Example 14

A granulated powder was obtained in the same way as in Example 7 except that a phosphoric acid was added to the tungsten primary powder in an amount of 0.005 mass %. The obtained granulated powder had an average particle diameter of 180 μm and a specific surface area of 8.8 m²/g; and contained 0.5 mass % of silicon, 3.3 mass % of oxygen, 300 mass ppm of carbon and 2 mass ppm of phosphorous. The content of each of the other impurity elements was 150 mass ppm or less.

Comparative Example 3

A zirconium powder was well mixed into a commercially-available tungsten powder so as to be contained in an amount of 1 mass %. The mixture was placed in a crucible and made into an alloy in a vacuum arc melting furnace. The obtained alloy was pulverized with the pulverizer used in Example 6 using tungsten balls as the pulverizing media and dried to thereby obtain a primary powder of tungsten-zirconium alloy having an average particle diameter of 0.5 μm and a specific surface area of 0.3 m²/g. Subsequently, a granulated powder of tungsten-zirconium alloy in the same way as in Example 1 except for the addition of silicon. The obtained granulated powder had an average particle diameter of 120 μm and a specific surface area of 0.2 m²/g; and contained 1 mass % of zirconium and 1 mass % of oxygen. The content of each of the other impurity elements was 440 mass ppm or less.

Comparative Example 4

A granulated powder was obtained in the same way as in Example 1 except that 1 mass % of silicon dioxide powder having an average particle diameter of 1 μm was mixed instead of the silicon in Example 1. The obtained granulated powder contained 0.5 mass % of silicon and 1.4 mass % of oxygen. The content of each of the other impurity elements was 350 mass ppm or less. The analysis for tungsten silicide in the same way as in Example 1 showed that no tungsten silicide was detected. Also, the SEM observation revealed that the silicon dioxide particles exist in isolation among the tungsten particles.

A molded body being 1.8×3.0×3.5 mm in size was produced by molding the granulated powder made in each of the above-mentioned examples. A tantalum wire of 0.29 mm in diameter stands upright in the 1.8×3.0 mm surface of the molded body, which is embedded 2.8 mm inside the molded body and protruded outside by 8 mm. The molded body was vacuum-sintered in the above-mentioned high-temperature vacuum furnace with molybdenum electrodes at 1,400° C. for 30 minutes to obtain a sintered body of 145 mg in mass.

The obtained sintered body was used as an anode body for an electrolytic capacitor. The anode body was subjected to chemical conversion in an aqueous solution of 0.1 mass % phosphorous acid at 9 V for two hours to form a dielectric layer on the surface of the anode body. The anode body having a dielectric layer formed thereon was immersed in an aqueous solution of 30% sulfuric acid to form an electrolytic capacitor, and the capacitance and LC value of the capacitor were measured. The capacitance was measured by using an LCR meter manufactured by Agilent at room temperature, 120 Hz and bias voltage of 2.5 V. The LC value was measured 30 seconds after applying a voltage of 2.5 V at room temperature.

The results of each of Examples and Comparative Examples are shown in Table 1.

TABLE 1

| | Silicon mass % | Other main elements | | Capacitance μF | LC μA |
|---|---|---|---|---|---|
| Example 1 | 4.8 | oxygen | 0.95 mass % | 770 | 10.5 |
| Example 2 | 0.05 | oxygen | 1.04 mass % | 850 | 11.3 |
| Example 3 | 0.2 | oxygen | 0.89 mass % | 800 | 4.0 |
| Example 4 | 0.5 | oxygen | 0.92 mass % | 830 | 3.1 |
| Example 5 | 6.8 | oxygen | 0.79 mass % | 640 | 13.7 |
| Example 6 | 3.7 | oxygen nitrogen | 880 mass ppm 0.15 mass % | 1300 | 1.5 |
| Example 7 | 0.5 | oxygen carbon phosphorous | 0.33 mass % 300 mass ppm 100 mass ppm | 4200 | 3.5 |
| Example 8 | 0.5 | oxygen nitrogen boron | 1.05 mass % 400 mass ppm 280 mass ppm | 820 | 1.2 |
| Example 9 | 3.7 | oxygen nitrogen | 5.4 mass % 0.13 mass % | 1300 | 4.9 |
| Example 10 | 0.5 | oxygen | 3.1 mass % | 4300 | 9.7 |
| Example 11 | 0.5 | oxygen nitrogen boron | 1.05 mass % 400 mass ppm 490 mass ppm | 820 | 2.9 |
| Example 12 | 0.5 | oxygen nitrogen boron | 1.1 mass % 400 mass ppm 2 mass ppm | 820 | 2.2 |
| Example 13 | 0.5 | oxygen carbon boron | 3.5 mass % 300 mass ppm 480 mass ppm | 4200 | 3.8 |
| Example 14 | 0.5 | oxygen carbon phosphorous | 3.3 mass % 300 mass ppm 2 mass ppm | 4200 | 4.3 |
| Comparative Example 1 | 0.03 | oxygen | 0.9 mass % | 880 | 96 |
| Comparative Example 2 | 7.4 | oxygen | 1.1 mass % | 600 | 48.2 |
| Comparative Example 3 | 0.0 | zirconium oxygen | 1 mass % 1 mass % | 520 | 29.3 |
| Comparative Example 4 | 0.5 *1 | oxygen | 1.4 mass % | 800 | 120 |

*1 Silicon exists as silicon dioxide.

Table 1 shows the LC characteristics per capacitance of the electrolytic capacitor in Examples are superior to those in Comparative Examples.

The invention claimed is:

1. A tungsten powder having tungsten particles comprising tungsten silicide on the surface of the particles, wherein the silicon content of the particles is 0.05 to 7 mass %.

2. The tungsten powder as claimed in claim 1, wherein the tungsten silicide is $W_5Si_3$.

3. The tungsten powder as claimed in claim 1, wherein the average primary particle diameter is 0.1 to 1 μm.

4. The tungsten powder as claimed in claim 1, wherein tungsten silicide is localized within 50 nm from the particle surface.

5. The tungsten powder as claimed in claim 1, having at least one member selected from tungsten nitride, tungsten carbide and tungsten boride on a part of the particle surface.

6. The tungsten powder as claimed in claim 1, further comprising elemental phosphorous in an amount of 1 to 500 mass ppm.

7. The tungsten powder as claimed in claim 1, further comprising oxygen in an amount of 0.05 to 8 mass %.

8. The tungsten powder as claimed in claim 1, wherein the content of the elements other than tungsten, silicon, nitrogen, carbon, boron, phosphorous and oxygen is 0.1 mass % or less.

9. The tungsten powder as claimed in claim 1, wherein the tungsten powder is a granulated powder.

10. The tungsten powder as claimed in claim 9, wherein the average particle diameter is 50 to 200 μm.

11. The tungsten powder as claimed in claim 9, wherein the specific surface area is 0.2 to 20 m$^2$/g.

12. The tungsten powder as claimed in claim 1, wherein the tungsten powder is for use in an electrolytic capacitor.

13. An anode body for capacitors obtained by sintering the tungsten powder claimed in claim 1.

14. An electrolytic capacitor composed of the anode body for capacitors claimed in claim 13 as one electrode and a dielectric body interposed between the electrode and a counter electrode.

15. A method for producing the tungsten powder claimed in claim 1, comprising mixing 0.05 to 7 mass % of the silicon powder into the tungsten powder and allowing the mixture to react by heating under reduced pressure.

16. The method for producing the tungsten powder as claimed in claim 15, wherein the heating temperature is 1,100 to 2,600° C.

17. A method for producing the tungsten powder claimed in claim 1, comprising pulverizing tungsten trioxide using the pulverizing media of the metal silicide under hydrogen atmosphere, followed by mixing the silicon powder into the pulverized powder and allowing the mixture to react by heating under reduced pressure.

18. The method for producing the tungsten powder as claimed in claim 17, wherein the heating temperature is 1,100 to 2,600° C.

19. The method for producing an anode body for capacitors, comprising sintering the tungsten powder claimed in claim 9.

* * * * *